(12) United States Patent
Lee

(10) Patent No.: US 8,089,240 B2
(45) Date of Patent: Jan. 3, 2012

(54) MOTOR AND METHOD FOR STARTING THE SAME

(75) Inventor: Gil Su Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 421 days.

(21) Appl. No.: 12/363,122

(22) Filed: Jan. 30, 2009

(65) Prior Publication Data

US 2009/0195198 A1    Aug. 6, 2009

(30) Foreign Application Priority Data

Jan. 31, 2008  (KR) ........................ 10-2008-0009993

(51) Int. Cl.
*H02P 1/16* (2006.01)
(52) U.S. Cl. ........................................ 318/778; 318/781
(58) Field of Classification Search .................. 318/781, 318/778
See application file for complete search history.

(56) References Cited

U.S. PATENT DOCUMENTS

| | | | | |
|---|---|---|---|---|
| 5,572,097 | A * | 11/1996 | Cameron | 318/400.11 |
| 5,801,500 | A * | 9/1998 | Jensen et al. | 318/400.09 |
| 6,100,656 | A * | 8/2000 | El-Sadi et al. | 318/400.11 |
| 2004/0012354 | A1* | 1/2004 | Krefta et al. | 318/439 |
| 2005/0184690 | A1* | 8/2005 | Petersen | 318/254 |
| 2008/0042613 | A1* | 2/2008 | Aizawa et al. | 318/778 |

* cited by examiner

*Primary Examiner* — Bentsu Ro
*Assistant Examiner* — Jorge Carrasquillo
(74) *Attorney, Agent, or Firm* — Birch, Stewart, Kolasch & Birch, LLP

(57) ABSTRACT

The method for initially starting the motor improves the reliability to the start of the motor. In particular, even though the external load is at more than a predetermined level, a rotor located at an arbitrary angle can be aligned to an accurate initial position. Moreover, it can prevent the damage of the motor or the damage of the electronic device where the motor is installed. In order to initially align the rotor of the motor, a position on a stationary coordinate system, to which an alignment current of a rotation magnetic field is applied, is varied.

18 Claims, 5 Drawing Sheets

MOTOR AND METHOD FOR STARTING THE SAME

CROSS-REFERENCE TO RELATED APPLICATIONS

The present application claims priority under 35 U.S.C. 119 and 35 U.S.C. 365 to Korean Patent Application No. 10-2008-0009993 (filed on 31 Jan. 2008), which is hereby incorporated by reference in its entirety.

BACKGROUND

The present disclosure relates to a motor and a method for starting the same, and more particularly, to a synchronous motor and a method for starting the same.

Motors are devices in which a rotor is rotated by an external power. Among the different types of motors, a synchronous motor is a motor in which a speed of a rotor follows a frequency of an external power. The rotor is rotated by applying an appropriate power to a stator according to a position of the rotor.

A synchronous motor is started by forcibly aligning the rotor to a desired position even though a position of the rotor is not known in the beginning. A representative method is to apply power strongly to one specific phase of three phases to place the rotor to the center of a coil to which the power is applied.

However, such a forced alignment method can align the rotor to an accurate position without alignment error of the rotor when no external load is applied to the rotor, but in many cases, the forced alignment is not achieved when an initial load is applied to the rotor.

If a scroll compressor is given as an example, even when the operation of the scroll compressor is in a stationary state, a fluid received in a compression space between an orbiting scroll and a fixed scroll can be under higher pressure compared to a fluid received in the other space. In this case, even though power is applied to any one of the three phases in order to forcibly aligning the motor, an electromagnetic force of the motor may be smaller than a force for compressing the fluid received in the compression space. In this case, the rotor is not aligned to an initial set position.

If the above-described state is mistaken for the achievement of the alignment and thus the motor starts to operate, the result is malfunctioning of the motor, damage of the compressor, and damage of electronic devices in the compressor.

SUMMARY

The disclosed method for starting a motor improves reliability of the initial alignment of the motor. The disclosure provides a method for starting a motor, improving reliability to a continuous operation of the motor by achieving an accurate initial alignment of a rotor even when an external load exists on the motor, and can accurately operate an electronic device in which the motor is installed.

In one embodiment, a method for initially starting a motor includes varying a position on a stationary coordinate system, to which an alignment current of a rotation magnetic field is applied, so as to initially align a rotor of the motor.

The alignment current of the rotation magnetic field may be continuously varied by at least 360 degrees. The alignment current of the rotation magnetic field may be applied at some position on the stationary coordinate system for a predetermined time, the position being varied at least one time. The alignment current of the rotation magnetic field may be applied to some position on the stationary coordinate system for a predetermined time, the position being varied sequentially.

The motor may be a 3-phase synchronous motor, a current applied to at least one phase of the 3 phases being continuously varied in an initial alignment after increasing for a predetermined time. Alternatively, the current applied to at least one phase of the 3 phases is discontinuously varied in an initial alignment after increasing for a predetermined time or the current applied to at least one phase of the 3 phases being sinusoidally varied in an initial alignment after increasing for a predetermined time.

In another embodiment, a method for starting a motor having a rotor and a stator includes initially aligning the rotor to a specific region on a stationary coordinate system, which is influenced by a start torque of the motor, by applying an alignment current to generate a maximum motor torque greater than at least an external load torque in a coil wound around the stator, such that an electrical angle is differently applied at least two times and estimating the rotor to be located at the specific region, and rotating the rotor.

The electrical angle of the alignment current may be continuously varied, the electrical angle may be varied by 360 degrees or electrical angle of the alignment current may also be discontinuously varied.

A sinusoidally varying region may exist in a variation curve of a current applied to at least one phase of a stationary coordinate system. A current applied to any one phase of a stationary coordinate system may be gradually increased in the initial alignment.

In further another embodiment, a motor includes a rotor, a coil wound around a stator, a controller for controlling an input power of the coil to control a rotation of the rotor. A PWM calculator receives a signal of an uvw stationary coordinate system to generate a PWM signal, an inverter receives the PWM signal to directly the input power of the coil, a current detector detects a d-axis present current (Id) and a q-axis present current (Iq) of a d-q rotating coordinate system as a present current output from the inverter. A current controller generates a d-axis reference voltage (Vd*) and a q-axis reference voltage (Vq*) on the d-q rotating coordinate system by referring to the present currents (Id, Iq) detected by the current detector, so as to follow a reference speed of the controller. A coordinate transformer transforms the d-q rotating coordinate system into the uvw stationary coordinate system and vice versa, wherein upon initial start of the motor, a reference current generated from the controller to generate a maximum motor torque greater than at least an external load torque is applied at different electrical angles at least two times, so that the rotor is initially aligned in a specific region on the uvw stationary coordinate system.

No hall sensor may be mounted on the stator. Upon the initial start of the motor, the reference current may generate a sine wave in at least one phase of the uvw stationary coordinate system. Sine waves are generated at all phases of the uvw stationary coordinate system where the sine wave is generated.

Upon the initial start of the motor, the reference current may generate an alignment current of some electrical angle for a predetermined time in at least one phase of the uvw stationary coordinate system.

A position of the electrical angle may be discontinuously increased.

Upon the initial start of the motor, the reference current may be gradually increased until the current reaches a predetermined current, in at least one phase of the uvw stationary coordinate system.

The details of the invention are set forth in the accompanying drawings and the description below. Other features will be apparent from the description and drawings, and from the claims.

DETAILED DESCRIPTION OF THE EMBODIMENTS

Reference will now be made in detail to the embodiments of the present disclosure, examples of which are illustrated in the accompanying drawings.

Figure 1:
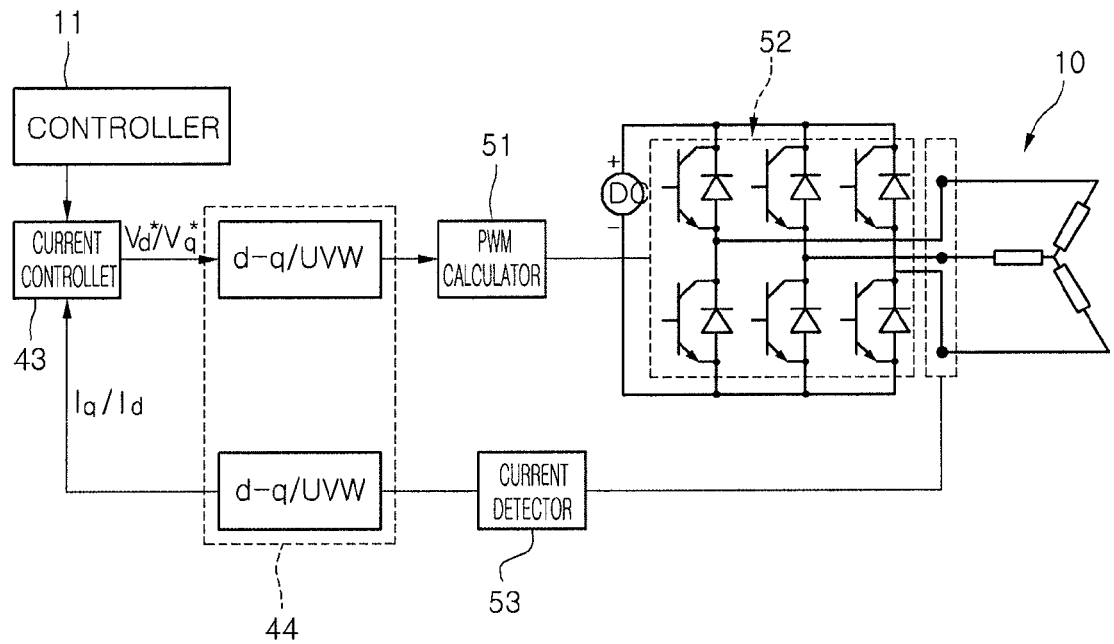
FIG. 1 is a schematic block diagram showing a synchronous motor.

FIG. 1 is a schematic block diagram showing a synchronous motor according to a first embodiment.

Referring to FIG. 1, the synchronous motor according to the first embodiment includes a controller 11, a pulse width modulation (PWM) calculator 51, an inverter 52, and a current detector 53. The controller 11 controls a rotation of a motor by controlling power input to a coil 10. The PWM calculator 51 receives a signal of an uvw stationary coordinate system which has three axes, one aligned with each coil, to generate a PWM signal. The inverter 52 receives the PWM signal to directly control power input to the motor. The current detector 53 detects a d-axis present current Id and a q-axis present current Iq as present currents output from the inverter 52.

Also, in order to follow a reference speed of the controller 11, the synchronous motor further includes a current controller 43 for generating a d-axis reference voltage Vd* and a q-axis reference voltage Vq* on a d-q rotating coordinate system, which is defined by a d-axis parallel to a magnetic flux direction of a permanent magnet of the motor and a q-axis perpendicular thereto, by referring to the present currents Id and Iq detected by the current detector 53. The synchronous motor further includes a coordinate transformer 44 for transforming the d-q rotating coordinate system into the uvw stationary coordinate system and vice versa.

Upon operation of the synchronous motor, the current controller 43 generates the reference voltage under control of the controller 11. At this point, a phase current detected by the current detector 53 is transformed into the present currents Id and Iq of the rotating coordinate system by the coordinate transformer 44, and then transferred to the current controller 43. Thus, the current controller 43 refers to the present currents Id and Iq, and generates the d-axis reference voltage Vd* and the q-axis reference voltage vq* such that the motor rotates while following the reference speed transferred from the controller 11.

The coordinate transformer 44 transforms a current of an uvw 3-phase stationary coordinate system into a current of a rotating coordinate system, which is defined by a q-axis parallel to a magnetic flux direction of a permanent magnet and a d-axis perpendicular thereto, or vice versa.

The rotating coordinate system is used for a vector control of the motor. The vector control method is a kind of a power application control method for controlling a current applied to a coil of the motor. The vector control method sets the d-q rotating coordinate system and controls a current applied in directions parallel to the d-axis and the q-axis. The vector control method can control the current applied to the motor more accurately.

The reference voltage output from the current controller 43 is transformed into the voltage of the stationary coordinate system by the coordinate transformer 44, and then input to the inverter 52 through the PWM calculator 51. The inverter 52 controls the current applied to the coil 10 to make the rotating speed of the motor follow the reference speed of the controller 11.

As described above, when the synchronous motor starts to rotate initially, the rotor is aligned to a specific position. At this point, when an external load exists in the rotor in the initial alignment, the alignment of the rotor may not be achieved. Such a relationship will be described with reference to a graph of FIG. 2.

Figure 2:
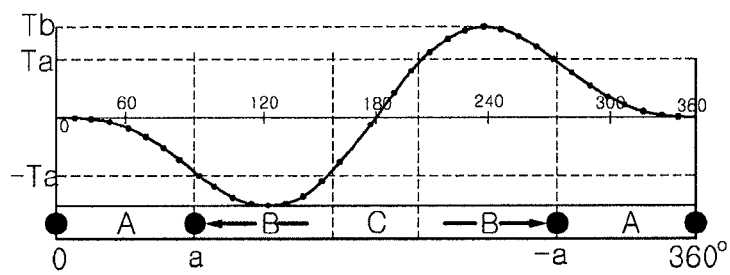
FIG. 2 is a torque diagram when an electrical angle of 360 degrees is one cycle and a current is applied to a specific phase on a stationary coordinate system.

FIG. 2 is a torque diagram when an electrical angle of 360 degrees is one cycle and a current is applied to a specific phase on a stationary coordinate system.

Referring to FIG. 2, a motor torque produced by an external current is shown in a form of a sine graph, and a load torque corresponding to a load applied to the motor, including both an external load and an internal load, is shown in a form of a horizontal line. At this point, a maximum amount of a torque in the motor torque diagram, that is, a maximum motor torque, is represented by Tb, and the torque varies according to an electrical position. The load torque is represented by Ta and has a width spaced in negative and positive directions. The motor torque diagram is not a sine wave but is inclined to some extent. This is caused by a reluctance torque existing inside the synchronous motor. The maximum motor torque Tb is varied according to a kind of product where the motor is installed, a specification, or an environment where the motor is placed. It is apparent that the maximum motor torque is varied according to an external current.

The motor does not rotate in regions A and C where the load torque Ta is greater than the motor torque. In a region B where the load torque Ta has a lesser magnitude than the motor torque, the motor rotates in a direction where the force is applied. This is because the electromagnetic force generated by the applied current is greater than the load existing in the compressor or the like connected to the motor, so that the motor resistance is less than the torque.

Of the regions A and C, the region A is a region adjacent to a desired alignment position (0 degree, 360 degrees) even though the rotor does not rotate. The region C is a region where a gap from the desired alignment position is great but the alignment is not achieved. Also, since a region of 0~a degrees is placed backward, when seen in a rotating direction of the motor, a correct alignment is not achieved. Thus, in the initial alignment of the motor, the alignment must be performed such that it is placed within a region of −a~360 (0) degrees after the completion of the alignment.

A motor alignment method for smooth alignment of the rotor will be described below.

Figure 3:
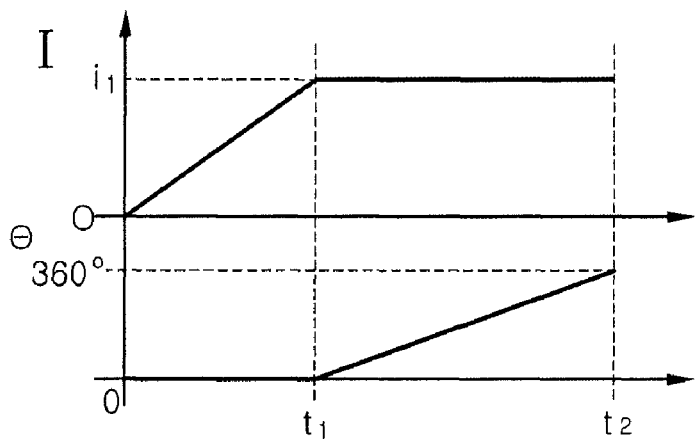
FIG. 3 is a graph showing a motor alignment method.

FIG. 3 is a graph showing a motor alignment method according to a first embodiment.

Referring to FIG. 3, for time of 0~t1, a current is applied to a d-axis of a rotating coordinate system, which is an electrical angle of 0 degree, with reference to FIG. 2. The amount of current is gradually increased from the beginning for a predetermined time. The gradual increase in the amount of the current aims to obtain sufficient time to initially start the rotor. After the current applied to the d-axis of the rotating coordinate system is increased to a predetermined alignment current $i_1$, the d-axis is rotated by an electrical angle of 360 degrees while applying the current to the d-axis of the rotating coordinate system. That is, the alignment current $i_1$ is applied while continuously changing the rotation magnetic field by 360 degrees. At this point, the alignment current $i_1$ may be constant.

Meanwhile, the magnitude of the alignment current i1 is applied such that a region where the maximum motor torque Tb is greater than the load torque Ta is generated by the alignment current i1 in a portion of the entire region of the electrical angle of 360 degrees. In this way, the rotor can follow the rotation magnetic field while the rotation magnetic field is applied. The magnitude of the alignment current i1 may be a magnitude of a torque to align the rotor within the region of –a~0 degree. In other words, an intersection point of the motor torque and the load torque Ta is set to be a position of "a" or less. To this end, the alignment current i1 applied actually may be somewhat greater than a current applied during a normal rotation of the motor.

In this way, after the alignment of the rotor is completed, the position of the rotor is located within the region of –a~0 degree. Thereafter, the synchronous motor rotates while gradually increasing its speed. More specifically, the frequency starts from a low value and gradually increases, and the rotor can rotate smoothly while following the frequency.

The alignment of the motor according to the current embodiment will be described in more detail, while estimating the position variation diagram of the rotor generated while applying the rotation magnetic field.

Figure 4:
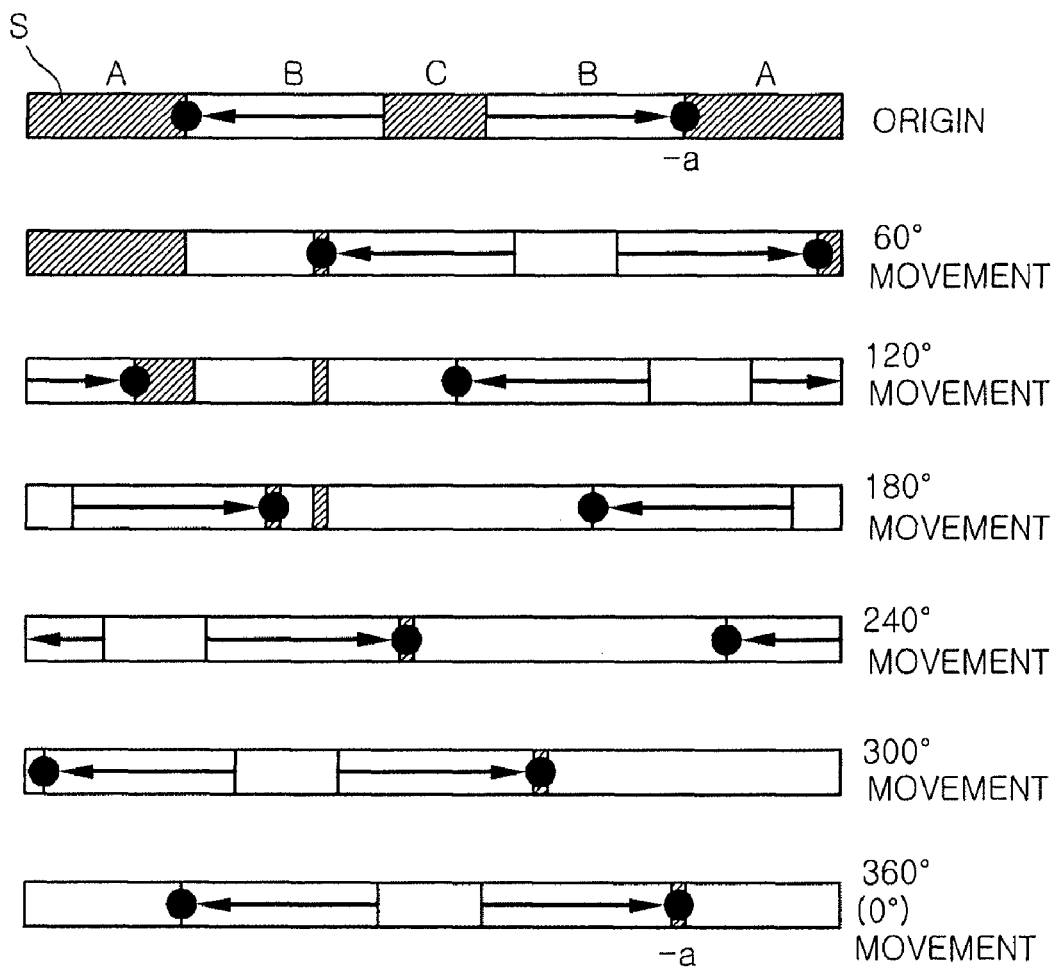
FIG. 4 is a position estimation diagram of a motor whenever a rotation magnetic field is varied by 60 degrees.

FIG. 4 is a position estimation diagram of a motor whenever a rotation magnetic field is varied by 60 degrees. However, an initial position of the rotor cannot be known from the position estimation diagram of FIG. 4. Thus, it is assumed that the rotor is located at an arbitrary position at an initial state. As described above, the regions A and C are dead zones where the rotor is not rotated by the external load even though the electromagnetic force is generated because the generated torque is less than the load torque Ta. The region B is a driving region where the rotor is rotated in an arrow direction. A dark circle is a point where the rotor is finally located when the rotor is moved in the range of the driving region. A region indicated by hashed lines is a region where the present rotor can be placed by variation from a previous arbitrary rotation magnetic field position to a present rotation magnetic field position.

Referring to FIG. 4, when the d-axis on the rotating coordinate system is placed at an origin (0 degree)—at this point, a current is applied to at least one phase of the stationary coordinate system and thus a maximum motor torque may be generated in a range between 120 degrees and 240 degrees, that is, when a current vector is applied to the origin, the regions A and C are an estimation region S where the rotor can be placed. As described above, this is because the rotor can be rotated only in the region B where the motor torque is greater than the load torque.

While the rotation magnetic field is varied by 60 degrees, the region S is gradually varied. The estimation region S on the left side of FIG. 4 remains without variation, but the estimation region on the right side of FIG. 4 is gradually reduced according to the variation of the rotation magnetic field.

While the rotation magnetic field is additionally varied by 120 degrees, the estimation region S on the left side is further reduced and thus is close to the estimation region on the right side.

While the rotation magnetic field is further varied by 180 degrees, the estimation region S on the right side is overlapped with the estimation region S on the left side.

Thereafter, while the rotation magnetic field is further varied by 360 degrees, the estimation region S overlapped at the single position is moved to –a degrees.

It can be seen that the rotor is initially aligned to the position of –a according to the variation of the estimation region S. As described above, the region of –a~0 degree becomes a position where the motor can be started. That is, the sufficient start torque can be ensured in this state, thereby starting the motor smoothly.

Thereafter, it is determined that the rotor is located in the region of –a~0 degree, and the rotor located in the corresponding region generates the start torque, which can start the rotor, thereby staring the rotation of the motor. Continuously, the controller 11 increases the rotating speed of the motor by gradually increasing the frequency.

Figure 5:
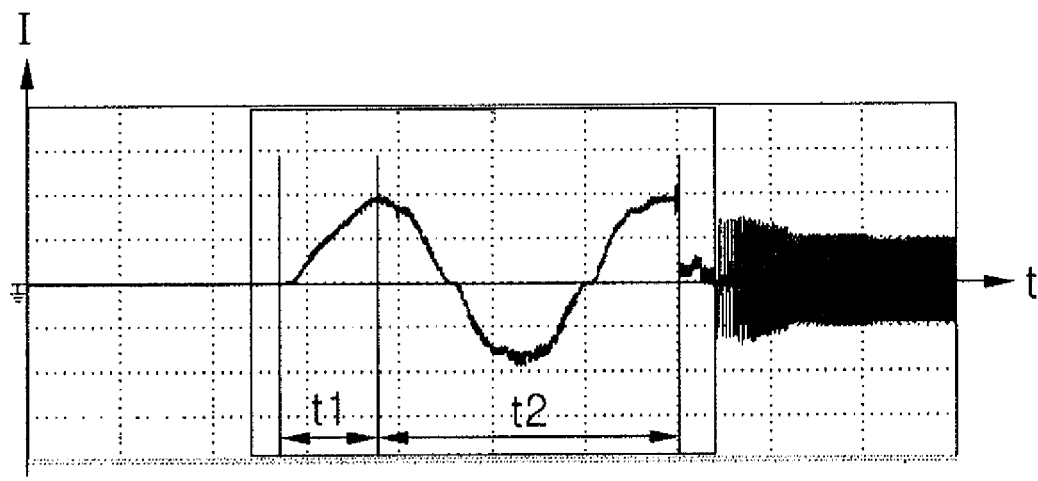
FIG. 5 is a current diagram at any one phase of a stationary coordinate system.

When the alignment method is performed in the above-described manner, a current applied to any one phase of the stationary coordinate systems, for example a U phase, is detected as shown in FIG. 5.

Referring to FIG. 5, if the motor starts to be aligned in a stationary state, an amount of current is gradually increased for a predetermined time t1. This is equal to the increase in an amount of current for a predetermined time t1 in FIG. 3. Thereafter, while the rotation magnetic field is varied by 360 degrees, an amount of current is also varied from maximum to minimum and is again varied to maximum for a predetermined time t2. It can be seen that this is equal to the 360-degree variation of the rotation magnetic field for a predetermined time in FIG. 3.

It can be seen that the variation of the applied current applied to any one phase of the stationary coordinate system is different from the case where the current is applied to the d-axis of the rotating coordinate system at a predetermined fixed electrical angle of the related art. For example, according to the related art method, the current applied to any one phase of the stationary coordinate system increases for a predetermined time and then the maximum current is maintained for a predetermined time. According to another method, the current may be exhibited in a pulse form.

Figure 6:
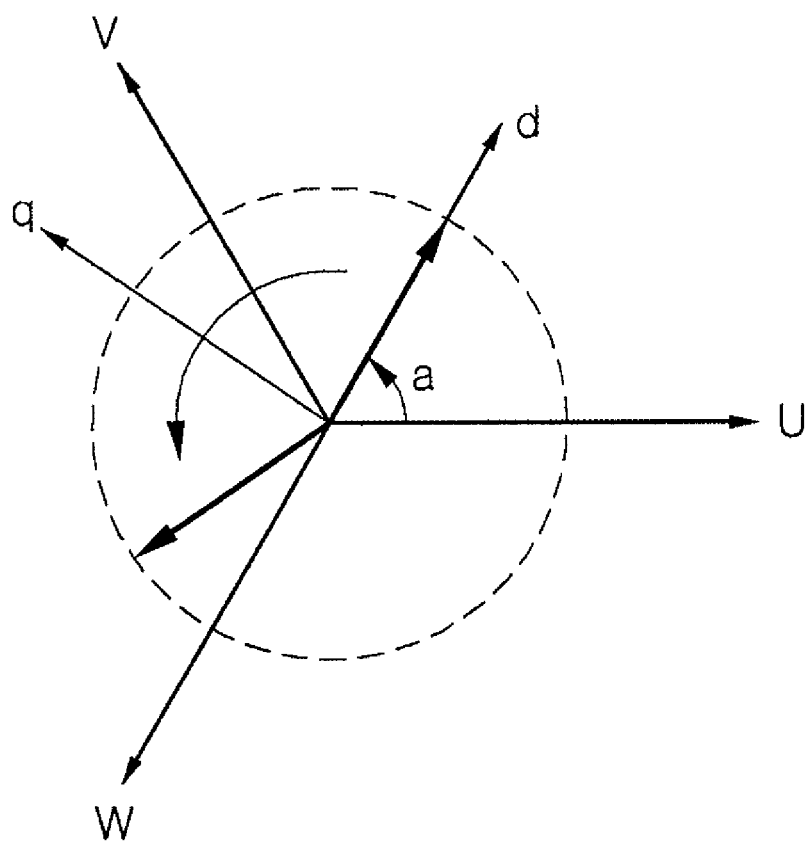
FIG. 6 is an overlapped diagram of a rotating coordinate system and a stationary coordinate system, showing a method for starting a motor by using the alignment method.

The motor starting method using the alignment method according to the embodiment is illustrated on the coordinate system as shown in FIG. 6.

Specifically, FIG. 6 is an overlapped diagram of the stationary coordinate system provided by uvw 3-phases, and the rotating coordinate system defined by the d-axis and the q-axis. It can be understood a process where the rotation magnetic field is continuously varied after applying power to the d-axis and then returns to an original position. It can be seen from FIG. 6 that the d-axis is exceeded by a degrees on + phase of the stationary coordinate system. Thus, when the rotation magnetic field is rotated by 360 degrees, it again returns to "a" degrees.

The power applied to the respective phases of the stationary coordinate system is varied so much. Of course, the above-described process moves the rotor to a region where the sufficient start torque can be provided.

Furthermore, according to the embodiment, the alignment and start of the rotor can be performed even though a sensor such as a hall sensor for detecting a position of the rotor inside the motor is not installed. In case where the hall sensor is not installed, the speed of the motor can be controlled by the current detected by the current detector 53. Therefore, the motor starting method according to the embodiment can be more suitably used for a synchronous motor for driving the compressor. Furthermore, the present invention can also be applied to various synchronous motors having different driving methods, such as SPMSM, IPMSM, PMA, and SyncRM.

Meanwhile, although it has been described in the above embodiment that the rotation magnetic field of 360 degrees is continuously formed, the rotation magnetic field of 360 degrees need not be always applied. Since the estimation region S has been greatly narrowed in the 180-degree rotated state, there is no problem in starting the motor if the estimation region S is set to be the start region in about the 180-degree rotated state. However, the 360-degree rotation magnetic field may be formed due to factors such as abrupt increase of the external load while the rotor is drawn during the alignment, or initial non-response of the rotor caused by inaccurate initial position of the rotor.

Furthermore, if the external load is significantly small or a large amount of current is applied, the dead zone region will be significantly reduced. In this case, the angle at which the rotation magnetic field is applied can be further reduced.

Meanwhile, after the motor is started and aligned by the method according to the present invention, it will be easily understood that the rotor is estimated to be located in the aligned region, and the motor is operated while varying the rotating speed of the motor by the vector control method, discussed earlier.

The above-described first embodiment discloses that the rotor is aligned to the preset accurate position by the 360-degree variation of the rotation magnetic field. However, the present invention is not limited to this alignment method, and may further include other embodiments. Another embodiment will be described below. Since the structure of the first embodiment is quoted, parts where no detailed description is made are the same as the first embodiment and their description will be omitted.

Figure 7:
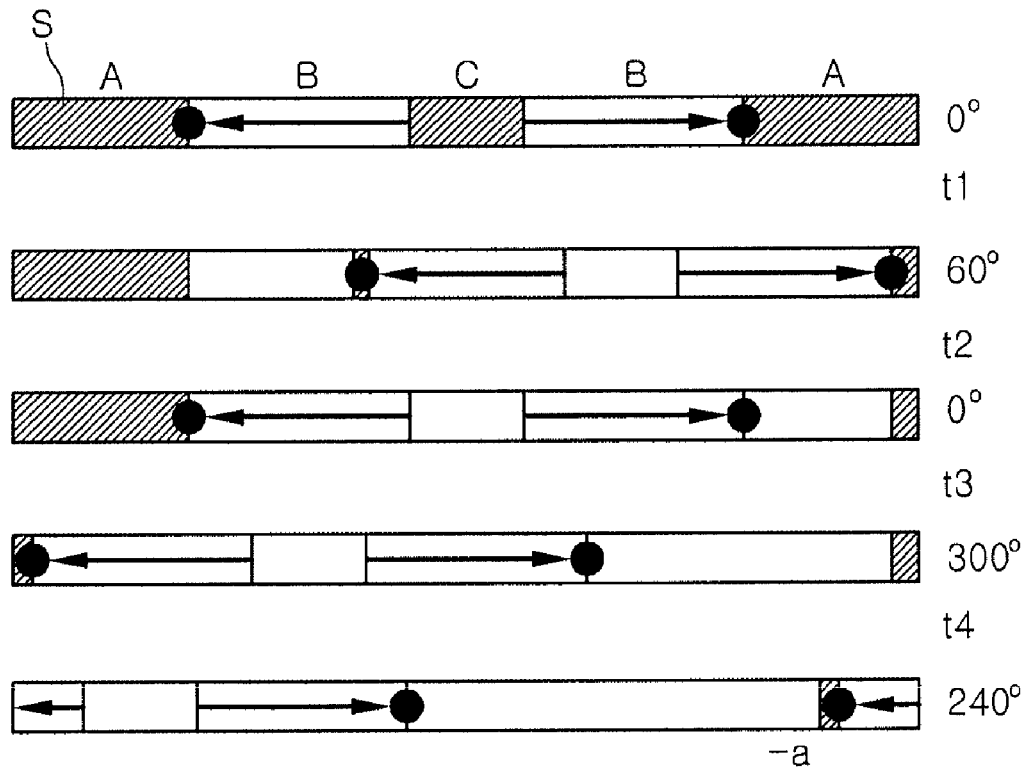
FIG. 7 is a diagram showing a position variation estimation of a rotor, for explaining an alignment of the motor according to a second embodiment.

FIG. 7 is a diagram showing a position variation of a rotor, for explaining an alignment of the motor according to a second embodiment. Like the first embodiment, the diagram of FIG. 7 operates in a state that an initial position of the rotor is not known.

In FIG. 7, regions A and C are dead zones where the rotor is not rotated. Region B is a driving region where the rotor is rotated in an arrow direction. A dark circle is a point where the rotor is finally located in the range of the driving region. Region S indicated by a dotted line is a region where the present rotor can be located by variation from a previous arbitrary rotation magnetic field position to a present rotation magnetic field position.

Referring to FIG. 7, as shown in the uppermost diagram, when the d-axis on the rotating coordinate system is placed at an origin (0 degree), a current is applied to at least one phase of the stationary coordinate system and thus a maximum motor torque may be generated in a range between 120 degrees and 240 degrees, the regions A and C are an estimation region S where the rotor can be placed. It can be easily understood that such a state is maintained for a predetermined time t1 to the extent that the rotor can be rotated.

Thereafter, when the current vector is in a 60-degree rotated state, the alignment current is maintained for a predetermined time t1. The rotor will be moved to a diagram of the second uppermost diagram. Thereafter, the current vector is again maintained in a 0-degree state for a predetermined time t2. Through the same procedure, the current vector is maintained in a 300-degree state for a predetermined time t3, and the current vector is maintained in a 240-degree state for a predetermined time t4.

It can be easily understood that the estimation region S where the rotor can be finally placed while the current vector is varied within a −a region like the lowermost diagram. As can be understood through the above description, the current vector in the second embodiment is not continuously varied like the first embodiment, but it is discretely applied for a predetermined time. It can be understood that the rotor is aligned to a set position by the above-described alignment method.

Figure 8:
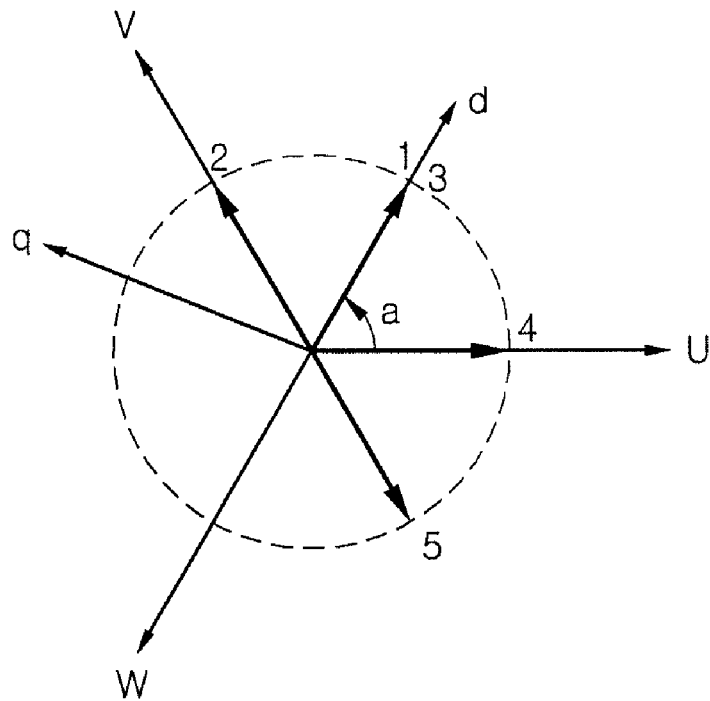
FIG. 8 is an overlapped diagram of a stationary coordinate system and a rotating coordinate system.

According to the second embodiment, it can be seen that an applied angle of the current vector is not constant in order. FIG. 8 orderly shows the current vectors applied with reference to the rotating coordinate system in the second embodiment. Referring to the overlapped diagram of the stationary coordinate system and the rotating coordinate system of FIG. 8, it can be seen that the applied direction of the current vectors are changed in order of 1, 2, 3, 4 and 5. It is apparent that the current vector may be applied in a different order.

In addition, as an extreme example, the external load is applied to the motor. However, when the magnitude of the external load is small, the rotor can be aligned to a desired position by the discrete applied current of two cases where the current is applied for a predetermined time in a 0-degree state and then the current is applied for a predetermined time in a 240-degree state. It can be easily understood that this is because the widths of the regions A and C, which are the dead zones, are significantly narrow, and the width of the region B, which is the driving region, is significantly wide.

Figure 9:
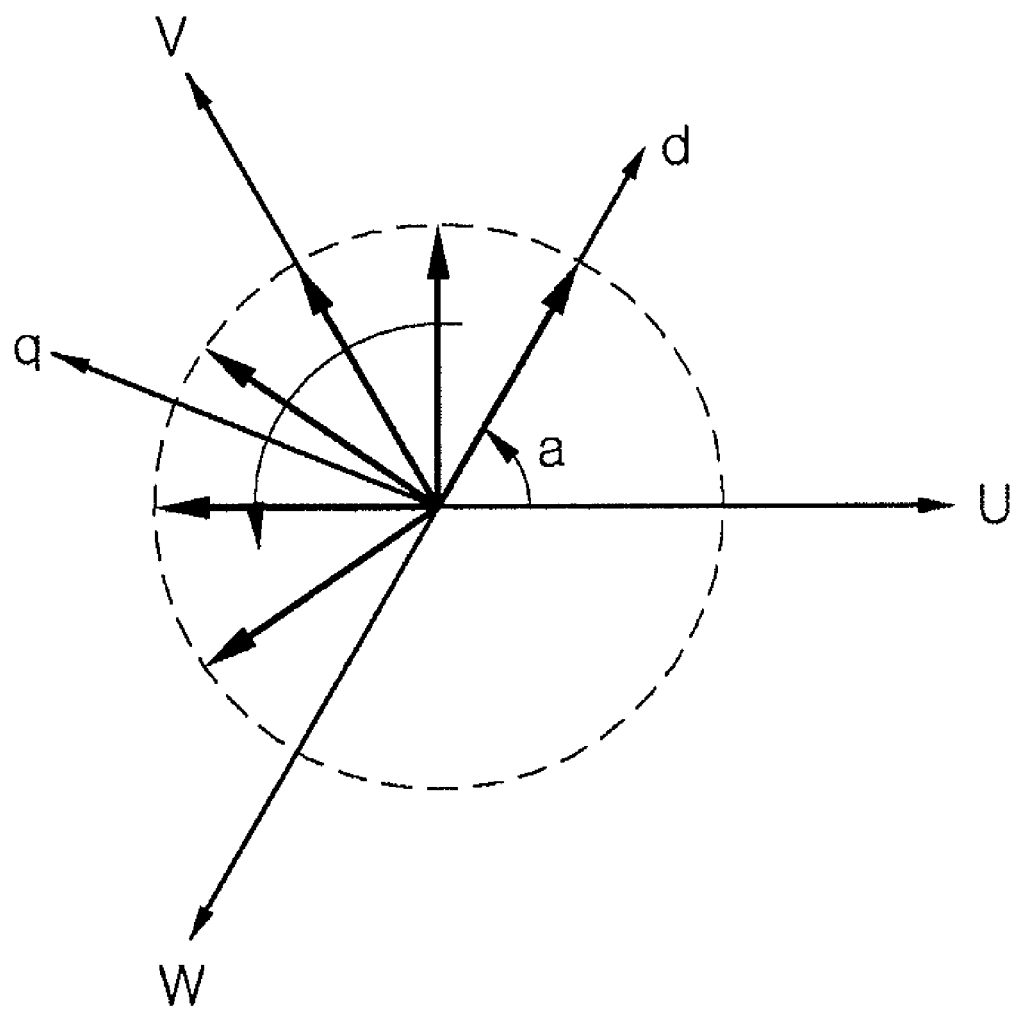
FIG. 9 is an overlapped diagram of a stationary coordinate system and a rotating coordinate system relating to a third embodiment.

FIG. 9 is an overlapped diagram of a stationary coordinate system and a rotating coordinate system according to a third embodiment.

Referring to FIG. 9, the third embodiment is identical to the second embodiment in that the current vector of a predetermined angle is applied for a predetermined time, but differs from the second embodiment in that the angle is gradually increased. Like the first embodiment, the motor can be aligned to a set angle at which the driving torque can be applied even though the current is applied.

Furthermore, when the external load of the motor is significantly small or the external current is significantly large, the motor can be aligned to a desired position by two current vectors sequentially applied, as described above in reference to the second embodiment.

The embodiments can improve the reliability to the initial start of the motor. In particular, even though the external load is at more than a predetermined level, the rotor located at an arbitrary angle can be aligned to an accurate initial position. Moreover, the embodiments can prevent the damage of the motor or the damage of the electronic device where the motor is installed.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A motor comprising:
   a rotor;
   a coil wound around a stator;
   a controller for controlling an input power of the coil to control a rotation of the rotor;
   a PWM calculator for receiving a signal of an uvw stationary coordinate system to generate a PWM signal;
   an inverter for receiving the PWM signal to directly the input power of the coil;
   a current detector for detecting a d-axis present current (Id) and a q-axis present current (Iq) of a d-q rotating coordinate system as a present current output from the inverter;
   a current controller for generating a d-axis reference voltage (Vd*) and a q-axis reference voltage (Vq*) on the d-q rotating coordinate system by referring to the present currents (Id, Iq) detected by the current detector, so as to follow a reference speed of the controller; and
   a coordinate transformer for transforming the d-q rotating coordinate system into the uvw stationary coordinate system and vice versa,
   wherein upon initial start of the motor, a reference current generated from the controller to generate a maximum motor torque greater than at least an external load torque is applied to the motor, and an amount of the reference current is gradually increased until the current reaches a predetermined current on at least one phase of the uvw stationary coordinate system, and the amount of the reference current is varied while an electrical angle is varied, so that the rotor is initially aligned in a specific region on the uvw stationary coordinate system.

2. The motor according to claim 1, wherein the reference current of the rotation magnetic field is continuously varied by at least 360 degrees.

3. The motor according to claim 1, wherein the reference current of the rotation magnetic field is applied at a same position on the stationary coordinate system for a predetermined time, the position being varied at least one time.

4. The motor according to claim 1, wherein the reference current of the rotation magnetic field is applied to a same position on the stationary coordinate system for a predetermined time, the position being varied sequentially.

5. The motor according to claim 1, wherein the motor is a 3-phase synchronous motor, a current applied to at least one phase of the 3 phases being continuously varied in an initial alignment after increasing for a predetermined time.

6. The motor according to claim 1, wherein the motor is a 3-phase synchronous motor, a current applied to at least one phase of the 3 phases being discontinuously varied in an initial alignment after increasing for a predetermined time.

7. The motor according to claim 1, wherein the motor is a 3-phase synchronous motor, a current applied to at least one phase of the 3 phases being sinusoidally varied in an initial alignment after increasing for a predetermined time.

8. The motor according to claim 1, wherein the electrical angle of the alignment current is continuously varied.

9. The motor according to claim 8, wherein the electrical angle is varied by 360 degrees.

10. The motor according to claim 1, wherein the electrical angle of the reference current is discontinuously varied.

11. The motor according to claim 1, wherein no hall sensor is mounted on the stator.

12. The motor according to claim 1, wherein upon the initial start of the motor, the reference current generates a sine wave at least one phase of the uvw stationary coordinate system.

13. The motor according to claim 12, wherein sine waves are generated at all phases of the uvw stationary coordinate system where the sine wave can be generated.

14. The motor according to claim 1, wherein upon the initial start of the motor, the reference current generates an alignment current of same electrical angle for a predetermined time on at least one phase of the uvw stationary coordinate system.

15. The motor according to claim 14, wherein a position of the electrical angle is discontinuously increased.

16. The motor according to claim 1, wherein the amount of the reference current is varied while the electrical angles is varied at least two times.

17. The motor according to claim 1, wherein the electrical angle is differently applied at least two times.

18. The motor according to claim 1, wherein the amount of current is varied from a predetermined maximum to a predetermined minimum and is again varied to the predetermined maximum for a predetermined time.

* * * * *